(12) United States Patent
Akizuki et al.

(10) Patent No.: US 12,249,735 B2
(45) Date of Patent: Mar. 11, 2025

(54) SECONDARY BATTERY

(71) Applicant: MURATA MANUFACTURING CO., LTD., Kyoto (JP)

(72) Inventors: Naoto Akizuki, Kyoto (JP); Masahiro Otsuka, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 652 days.

(21) Appl. No.: 17/507,366

(22) Filed: Oct. 21, 2021

(65) Prior Publication Data

US 2022/0045404 A1 Feb. 10, 2022

Related U.S. Application Data

(63) Continuation of application No. PCT/JP2020/016955, filed on Apr. 17, 2020.

(30) Foreign Application Priority Data

Apr. 25, 2019 (JP) .................................. 2019-084544

(51) Int. Cl.
*H01M 50/477* (2021.01)
*H01M 10/0525* (2010.01)
(Continued)

(52) U.S. Cl.
CPC ..... *H01M 50/477* (2021.01); *H01M 10/0525* (2013.01); *H01M 50/533* (2021.01);
(Continued)

(58) Field of Classification Search
CPC ......... H01M 10/0525; H01M 2220/30; H01M 50/105; H01M 50/469; H01M 50/474;
(Continued)

(56) References Cited

U.S. PATENT DOCUMENTS

2007/0231686 A1* 10/2007 Kim .................... H01M 50/553
429/174
2018/0261806 A1 9/2018 Kawate et al.
2019/0341587 A1* 11/2019 Pasma ................. H01M 50/543

FOREIGN PATENT DOCUMENTS

JP 2003242957 8/2003
JP 2009224094 A 10/2009
(Continued)

OTHER PUBLICATIONS

Chinese Office Action issued Dec. 25, 2023 in corresponding Chinese Application No. 202080031275.5.
International Search Report for Application No. PCT/JP2020/016955, dated Jul. 7, 2020.
Japanese Office Action issued Sep. 6, 2022 in corresponding Japanese Application No. 2021-516086.
(Continued)

*Primary Examiner* — Victoria H Lynch
(74) *Attorney, Agent, or Firm* — K&L Gates LLP

(57) ABSTRACT

Provided is a secondary battery including an electrode assembly and an electrolyte enclosed in an exterior case. The electrode assembly includes a positive electrode, a negative electrode, and a separator disposed between the positive electrode and the negative electrode. The secondary battery includes a spacer positioned between the electrode assembly and the exterior case. The electrode assembly includes a positive electrode current collecting tab and a negative electrode current collecting tab protruding from the electrode assembly. The spacer includes a first recess for the positive electrode current collecting tab and a second recess for the negative electrode current collecting tab at an outer edge in plain view, and the first recess and the second recess are provided with a separation portion interposed therebetween.

20 Claims, 11 Drawing Sheets

(51) Int. Cl.
*H01M 50/533* (2021.01)
*H01M 50/547* (2021.01)
*H01M 50/627* (2021.01)
H01M 50/105 (2021.01)
H01M 50/469 (2021.01)

(52) U.S. Cl.
CPC ....... *H01M 50/547* (2021.01); *H01M 50/627* (2021.01); *H01M 50/105* (2021.01); *H01M 50/469* (2021.01); *H01M 2220/30* (2013.01)

(58) Field of Classification Search
CPC ............. H01M 50/477; H01M 50/533; H01M 50/547; H01M 50/55; H01M 50/553; H01M 50/586; H01M 50/593; H01M 50/627; Y02E 60/10; Y02P 70/50
See application file for complete search history.

(56) References Cited

FOREIGN PATENT DOCUMENTS

| | | |
|---|---|---|
| JP | 2013182852 A | 9/2013 |
| JP | 2014170664 A | 9/2014 |
| JP | 2015162274 A | 9/2015 |
| JP | 2018107099 A | 7/2018 |
| WO | 2017047784 A1 | 3/2017 |

OTHER PUBLICATIONS

Japanese Office Action issued Apr. 18, 2023 in corresponding Japanese Application No. 2021-516086.
Chinese Office Action issued Jun. 24, 2024 in corresponding Chinese Application No. 202080031275.5.

\* cited by examiner

FIG. 4B

FIG 4F
(F) 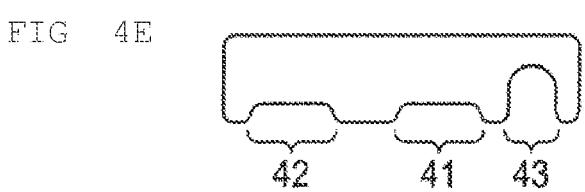
FIG 4G
(G) 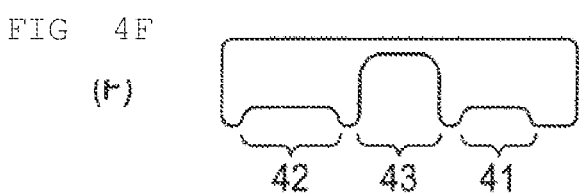

PRIOR ART

SECONDARY BATTERY

CROSS REFERENCE TO RELATED APPLICATIONS

The present application is a continuation of PCT patent application no. PCT/JP2020/016955, filed on Apr. 17, 2020, which claims priority to Japanese patent application no. JP2019-084544 filed on Apr. 25, 2019, the entire contents of which are being incorporated herein by reference.

BACKGROUND

The present disclosure generally relates to a secondary battery.

The secondary battery can be repeatedly charged and discharged because of a so-called storage battery, and is used for various applications. For example, secondary batteries are used in mobile devices such as mobile phones, smartphones, and notebook computers.

The secondary battery generally has a structure in which an electrode assembly is housed in an exterior case. That is, in the secondary battery, the electrode body is housed in the exterior case as the case.

SUMMARY

The present disclosure generally relates to a secondary battery.

The inventors of the present application have noticed that there is a problem to be overcome in the conventional secondary battery, and have found a need to take measures therefor. Specifically, the inventors of the present application have found that there are the following problems.

A secondary battery generally has a structure in which an electrode assembly including a positive electrode, a negative electrode, and a separator disposed therebetween, and an electrolyte are enclosed in an exterior case. The electrode assembly includes a positive electrode current collecting tab and a negative electrode current collecting tab protruding from the electrode assembly. In addition, a spacer for insulating the electrode assembly and the exterior case is provided between the electrode assembly and the exterior case.

In the exemplary embodiment shown in FIG. 11, the positive electrode current collecting tab 61 and the negative electrode current collecting tab 62 protrude from the end face 200' of the electrode assembly 200 (see FIG. 11A). A spacer 4 is provided between the end face 200' and an exterior case (not shown). The spacer 4 is provided with two hollow portions 8 through which the positive electrode current collecting tab 61 and the negative electrode current collecting tab 62 pass (see FIG. 11B).

Since the strength of the portion of the spacer 4 around the penetrating opening 8 can be greatly reduced, such a portion may be deformed and/or damaged when an impact or heat is applied to the battery. Accordingly, there is a possibility that the current collecting tabs of the positive and negative electrodes come into contact with each other and short-circuit occurs.

The present disclosure has been made in view of such problems. That is, an object of the present disclosure is to provide a secondary battery more suitable in terms of preventing a short circuit and preventing breakage of a current collecting tab.

According to an embodiment of the present disclosure, a secondary is provided. The secondary battery includes an electrode assembly and an electrolyte enclosed in an exterior case. The electrode assembly includes a positive electrode, a negative electrode, and a separator disposed between the positive electrode and the negative electrode. The secondary battery includes a spacer positioned between the electrode assembly and the exterior case. The electrode assembly includes a positive electrode current collecting tab and a negative electrode current collecting tab protruding from the electrode assembly. The spacer includes a first recess for the positive electrode current collecting tab and a second recess for the negative electrode current collecting tab at an outer edge in plain view, and the first recess and the second recess are provided with a separation portion interposed therebetween.

The secondary battery according to the present disclosure has a more suitable structure in terms of preventing a short circuit.

Specifically, in the secondary battery according to an embodiment of the present disclosure, the spacer positioned between the electrode assembly and the exterior case has a first recess for the positive electrode current collecting tab and a second recess for the negative electrode current collecting tab at the outer edge thereof. With such a recess, it is possible to position one end of the current collecting tab protruding from the electrode assembly toward the exterior case without providing an opening penetrating the spacer. As a result, it is possible to suppress a decrease in strength around the hollow portion defined by the recess provided in the spacer for the current collecting tab. Therefore, it is possible to more suitably prevent a short circuit due to contact between the current collecting tabs of the positive and negative electrodes.

BRIEF DESCRIPTION OF THE FIGURES

FIGS. 4A-4G are schematic plan views of various aspects of the spacer according to an embodiment of the present disclosure.

DETAILED DESCRIPTION

Figure 1A:
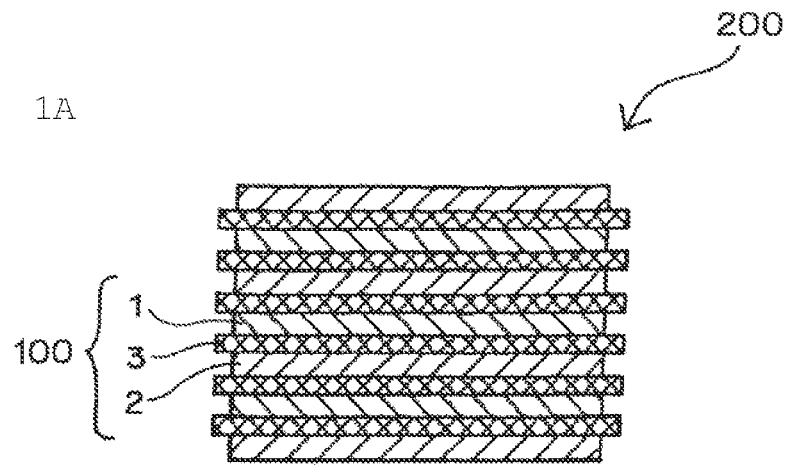
FIGS. 1A and 1B are schematic sectional views (FIG. 1A: non-wound planar lamination type battery, FIG. 1B: wound battery) of an electrode assembly according to an embodiment of the present disclosure.

Hereinafter, a secondary battery according to an embodiment of the present disclosure will be described in more detail. Although the description will be made with reference to the drawings as necessary, various elements in the drawings are merely schematically and exemplarily illustrated for understanding of the present disclosure, and appearance, dimensional ratios, and the like may be different from actual ones.

In the present specification, the "sectional view of the secondary battery" is based on a virtual section of an object obtained by cutting along a thickness direction based on a lamination direction of each layer constituting the secondary battery. For example, it is based on a section cut along a face constituted by a thickness direction based on a lamination direction of electrode layers constituting the secondary battery and a longitudinal direction in which the electrode layers extend in a direction in which the electrode terminals are located. In short, it is based on the form of the section of the secondary battery shown in FIG. 6 and the like.

In the present specification, the "plan view of the spacer" is based on a sketch drawing when an object is viewed from the upper side or the lower side along the thickness direction based on the shape direction in which the spacer has the smallest dimension. For example, it is based on a form of a plane formed by a longitudinal direction based on a shape direction in which the spacer has the largest dimension and a width direction having the next largest dimension to the longitudinal direction. In short, it is based on the form of the plane of the spacer shown in FIG. 4 and the like.

The present disclosure provides a secondary battery. In the present specification, the term "secondary battery" refers to a battery that can be repeatedly charged and discharged. The "Secondary battery" is not excessively restricted to its name, and may include, for example, an electrochemical device such as an "electrical storage device".

Figure 1B:
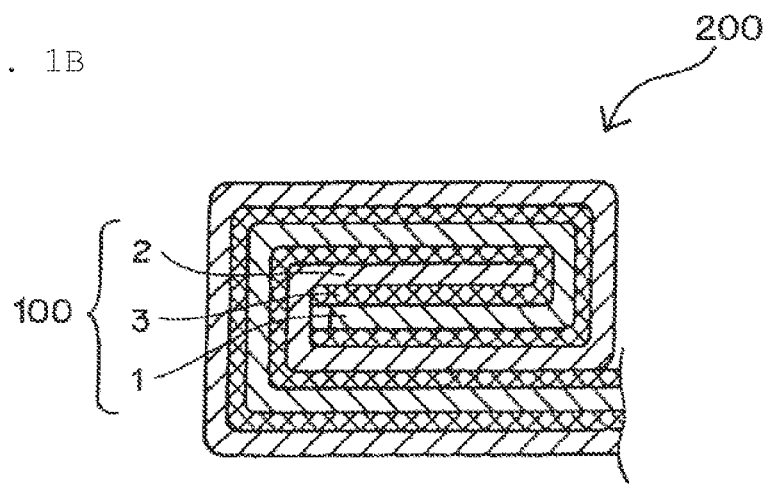

A secondary battery according to the present disclosure includes an electrode assembly having an electrode constituent unit including a positive electrode, a negative electrode, and a separator. FIGS. 1A and 1B illustrate the electrode assembly 200. As illustrated, the positive electrode 1 and the negative electrode 2 are laminated with the separator 3 interposed therebetween to form an electrode constituent unit 100, and at least one or more of the electrode constituent units 100 are laminated to form an electrode assembly (see FIG. 1A), or the electrode constituent unit is wound to form the electrode assembly (see FIG. 1B). In the secondary battery, such an electrode assembly together with an electrolyte (for example, a nonaqueous electrolyte) is enclosed in an exterior case.

The positive electrode includes at least a positive electrode material layer and a positive electrode current collector (for example, a positive electrode current collector in a layer form). In the positive electrode, a positive electrode material layer is provided on at least one face of the positive electrode current collector, and the positive electrode material layer contains a positive electrode active substance as an electrode active substance. For example, in each of the plurality of positive electrodes in the electrode assembly, the positive electrode material layer may be provided on both faces of the positive electrode current collector, or the positive electrode material layer may be provided only on one face of the positive electrode current collector. From the viewpoint of further increasing the capacitance of the secondary battery, the positive electrode preferably includes the positive electrode material layer on both faces of the positive electrode current collector.

The negative electrode includes at least a negative electrode material layer and a negative electrode current collector (for example, a negative electrode current collector in a layer form). In the negative electrode, a negative electrode material layer is provided on at least one face of a negative electrode current collector, and the negative electrode material layer contains a negative electrode active substance as an electrode active substance. For example, in each of the plurality of negative electrodes in the electrode assembly, the negative electrode material layer may be provided on both faces of the negative electrode current collector, or the negative electrode material layer may be provided only on one face of the negative electrode current collector. From the viewpoint of further increasing the capacitance of the secondary battery, the negative electrode preferably includes the negative electrode material layer on both faces of the negative electrode current collector.

The electrode active substances contained in the positive electrode and the negative electrode, that is, the positive electrode active substance and the negative electrode active substance are substances directly involved in electron transfer in the secondary battery, and are main substances of positive and negative electrodes responsible for charge and discharge, that is, the cell reaction. More specifically, ions are generated in the electrolyte due to "the positive electrode active substance contained in the positive electrode material layer" and "the negative electrode active substance contained in the negative electrode material layer", and such ions are transferred between the positive electrode and the negative electrode to transfer electrons, resulting in charging and discharging. It is preferable that the positive electrode material layer and the negative electrode material layer be layers capable of absorbing and releasing lithium ions, in particular. That is, the battery is preferably a nonaqueous electrolyte secondary battery in which lithium ions move between the positive electrode and the negative electrode with the nonaqueous electrolyte interposed therebetween to charge and discharge the battery. When lithium ions are involved in charging and discharging, the secondary battery according to the present disclosure corresponds to a so-called lithium ion battery, and the positive electrode and the negative electrode have a layer capable of absorbing and releasing lithium ions.

The positive electrode active substance of the positive electrode material layer, which comprises, for example, a granular material, preferably includes a binder (also referred to as a "binding material") for sufficient contact between grains and shape retention in the positive electrode material layer. Furthermore, a conductive auxiliary agent may be contained in the positive electrode material layer in order to facilitate transmission of electrons for promoting the cell reaction. Similarly, the negative electrode active substance of the negative electrode material layer, which comprises, for example, a granular material, preferably includes a binder for sufficient contact between grains and shape retention, and a conductive auxiliary agent for smooth transfer of electrons promoting a cell reaction may be included in the negative electrode material layer. As described above, since the plurality of components is contained, the positive electrode material layer and the negative electrode material layer can also be referred to as "positive electrode mixture material layer" and "negative electrode mixture material layer", respectively.

It is preferable that the positive electrode active substance be a substance contributing to absorbing and releasing of lithium ions. In this respect, it is preferable that the positive electrode active substance be, for example, a lithium-containing composite oxide. More specifically, the positive electrode active substance may be a lithium transition metal composite oxide containing lithium and at least one transition metal selected from the group consisting of cobalt, nickel, manganese, and iron. That is, in the positive electrode material layer of the secondary battery according to the embodiment, such a lithium transition metal composite oxide is preferably included as a positive electrode active substance. For example, the positive electrode active substance is lithium cobalt oxide, lithium nickel oxide, lithium manganate, lithium iron phosphate, or a material in which some of their transition metals are replaced with another metal. Although such a positive electrode active substance may be included as a single material, two or more materials may be contained in combination. In a more preferred aspect, the positive electrode active substance contained in the positive electrode material layer may be lithium cobalt oxide.

The binder that can be contained in the positive electrode material layer is not particularly limited, but examples thereof may include at least one selected from the group consisting of polyvinylidene fluoride, vinylidene fluoride-hexafluoropropylene copolymer, vinylidene fluoride-tetrafluoroethylene copolymer, polytetrafluoroethylene and the like. The conductive auxiliary agent which can be contained in the positive electrode material layer is not particularly limited, but examples thereof may include at least one selected from the group consisting of carbon black such as thermal black, furnace black, channel black, ketjen black and acetylene black, carbon fiber such as graphite, carbon nanotube and vapor phase growth carbon fiber, metal powder such as copper, nickel, aluminum and silver, polyphenylene derivative and the like. In an exemplary embodiment, the binder of the positive electrode material layer is polyvinylidene fluoride, and in another exemplary embodiment, the conductive auxiliary agent of the positive electrode material layer is carbon black. In further another exemplary embodiment, the binder and the conductive auxiliary agent of the positive electrode material layer are a combination of polyvinylidene fluoride and carbon black.

The thickness dimension of the positive electrode material layer is not particularly limited, but is preferably 1 μm or more and 300 μm or less, for example, 5 μm or more and 200 μm or less. The thickness dimension of the positive electrode material layer is the thickness inside the secondary battery, and an average value of measured values at any 10 points may be used.

The negative electrode active substance is preferably a substance that contributes to absorbing and releasing of lithium ions. In this respect, it is preferable that the negative electrode active substance be, for example, various carbon materials, oxides or lithium alloys.

Examples of various carbon materials of the negative electrode active substance include graphite (for example, natural graphite and/or artificial graphite), hard carbon, soft carbon, and/or diamond-like carbon. Specifically, graphite is preferable because it has high electron conductivity and excellent adhesion to a negative electrode current collector and the like. Examples of the oxide of the negative electrode active substance may include at least one selected from the group consisting of silicon oxide, tin oxide, indium oxide, zinc oxide, lithium oxide and the like. The lithium alloy of the negative electrode active substance may be any metal that can be alloyed with lithium and examples thereof may include a binary, ternary or higher alloy of a metal such as Al, Si, Pb, Sn, In, Bi, Ag, Ba, Ca, Hg, Pd, Pt, Te, Zn, and La, and lithium. Such an oxide may be amorphous as its structural form. This is because degradation due to nonuniformity such as grain boundaries or defects hardly occurs. In an exemplary embodiment, the negative electrode active substance of the negative electrode material layer is artificial graphite.

The binder that can be contained in the negative electrode material layer is not particularly limited, but examples thereof may include at least one selected from the group consisting of styrene butadiene rubber, polyacrylic acid, polyvinylidene fluoride, polyimide-based resin and polyamideimide-based resin. In a more preferred embodiment, the binder contained in the negative electrode material layer is styrene butadiene rubber. The conductive auxiliary agent which can be contained in the negative electrode material layer is not particularly limited, but examples thereof may include at least one selected from the group consisting of carbon black such as thermal black, furnace black, channel black, ketjen black and acetylene black, carbon fiber such as graphite, carbon nanotube and vapor phase growth carbon fiber, metal powder such as copper, nickel, aluminum and silver, polyphenylene derivative and the like. The negative electrode material layer may contain a component attributable to the thickener component (for example, carboxymethyl cellulose) used at the time of manufacturing the battery.

In an exemplary embodiment, the negative electrode active substance and the binder in the negative electrode material layer are a combination of artificial graphite and styrene butadiene rubber.

The thickness dimension of the negative electrode material layer is not particularly limited, but is preferably 1 μm or more and 300 μm or less, for example, 5 μm or more and 200 μm or less. The thickness dimension of the negative electrode material layer is the thickness inside the secondary battery, and an average value of measured values at any 10 points may be used.

The positive electrode current collector and the negative electrode current collector used for the positive electrode and the negative electrode are members that contribute to the collection and supply of electrons generated in the active substance due to the cell reaction. Such a current collector may be a sheet-like metal member and may have a porous or perforated form. For example, the current collector is a metal foil, a punching metal, a net, an expanded metal or the like. The positive electrode current collector used for the positive electrode preferably comprises a metal foil containing at least one selected from the group consisting of aluminum, stainless steel, nickel and the like, and may be, for example, an aluminum foil. On the other hand, the negative electrode current collector used for the negative electrode preferably comprises a metal foil containing at least one selected from the group consisting of copper, stainless steel, nickel and the like, and may be, for example, a copper foil.

The separator is a member provided from the viewpoint of prevention of short circuit by contact of the positive and negative electrodes, retention of the electrolyte and the like. In other words, it can be said that the separator is a member that passes ions while preventing electronic contact between the positive electrode and the negative electrode. Preferably, the separator is a porous or microporous insulating member and has a film form due to its small thickness. Although it is merely an example, a microporous membrane made of polyolefin may be used as a separator. In this regard, the microporous membrane used as a separator may be, for example, a polyolefin containing only polyethylene (PE) or polypropylene (PP). Furthermore, the separator may be a laminate composed of a "microporous membrane made of PE" and a "microporous membrane made of PP". The surface of the separator may be covered with an inorganic grain coat layer and/or an adhesive layer or the like. The surface of the separator may have adhesion.

The thickness dimension of the separator is not particularly limited, but is preferably 1 μm or more and 100 μm or less, for example, 5 μm or more and 20 μm or less. The thickness dimension of the separator is the thickness inside the secondary battery (particularly, the thickness between the positive electrode and the negative electrode), and an average value of measured values at any 10 points may be used.

In the secondary battery according to the present disclosure, an electrode assembly including a positive electrode, a negative electrode, and a separator, together with an electrolyte, is enclosed in an exterior case. The electrolyte assists the movement of the metal ions released from the electrodes (positive electrode/negative electrode). The electrolyte may be a "nonaqueous" electrolyte such as an organic electrolyte and an organic solvent, or may be an "aqueous" electrolyte containing water. In an exemplary embodiment, the battery is a nonaqueous electrolyte secondary battery using an electrolyte containing a "nonaqueous" solvent and a solute as an electrolyte. The electrolyte may have a form such as liquid or gel (note that the term "liquid" nonaqueous electrolyte is also referred to herein as "nonaqueous electrolyte liquid").

It is preferable to include at least carbonate as a specific solvent for the nonaqueous electrolyte. Such carbonate may be cyclic carbonates and/or chain carbonates. Although not particularly limited, examples of the cyclic carbonates may include at least one selected from the group consisting of propylene carbonate (PC), ethylene carbonate (EC), butylene carbonate (BC) and vinylene carbonate (VC). Examples of the chain carbonates may include at least one selected from the group consisting of dimethyl carbonate (DMC), diethyl carbonate (DEC), ethyl methyl carbonate (EMC) and dipropyl carbonate (DPC). In one exemplary embodiment of the present disclosure, a combination of cyclic carbonates and chain carbonates is used as the nonaqueous electrolyte, and, for example, a mixture of ethylene carbonate and diethyl carbonate is used. As a specific nonaqueous electrolyte solute, for example, Li salts such as $LiPF_6$ and $LiBF_4$ are preferably used.

As the current collecting tab, any current collecting tab used in the field of secondary battery can be used. The current collecting tab may be composed of a material for which electron transfer can be achieved, and is usually composed of a conductive material such as silver, gold, copper, iron, tin, platinum, aluminum, nickel, and/or stainless steel. The form of the current collecting tab is not particularly limited, and may be, for example, a linear shape or a plate shape. The current collecting tabs of the positive electrode and the negative electrode (hereinafter also collectively referred to as "current collecting tabs of positive and negative electrodes") may protrude from any face of the electrode assembly. The current collecting tabs of the positive and negative electrodes may protrude from different faces of the electrode assembly, or may protrude from the same face. From the viewpoint of making the secondary battery compact, it is preferable that the current collecting tabs of the positive and negative electrodes protrude from the same face. That is, the positive electrode current collecting tab and the negative electrode current collecting tab may extend so as to protrude from the same end face (that is, the same side face) of the electrode assembly.

The exterior case is usually a hard case, and may be composed of two members such as a main body and a lid. For example, in a case where the exterior case includes a main body and a lid, the main body and the lid are sealed after the electrode assembly, the electrolyte, the current collecting tab, the electrode terminal as desired, and the like are housed. The method of sealing the exterior case is not particularly limited, and examples thereof include a laser irradiation method.

Any material that can constitute a hard case exterior case in the field of secondary batteries can be used as the material constituting the main body and the lid of the exterior case. Such a material may be a conductive material for which electron transfer may be achieved or an insulating material for which electron transfer may not be achieved. The material of the exterior case is preferably a conductive material from the viewpoint of taking out the electrode.

Examples of the conductive material include conductive materials such as silver, gold, copper, iron, tin, platinum, aluminum, nickel, and/or stainless steel. Examples of the insulating material include insulating polymer materials such as polyester (for example, polyethylene terephthalate), polyimide, polyamide, polyamideimide, and/or polyolefin (for example, polyethylene and/or polypropylene).

From the viewpoint of the above-described conductivity and rigidity, both the main body and the lid may be made of stainless steel. As defined in "JIS G0203 Glossary of terms used in iron and steel", stainless steel is chromium or alloy steel containing chromium or chromium and nickel, and generally refers to steel having a chromium content of about 10.5% or more of the whole. Examples of such stainless steel include martensitic stainless steel, ferritic stainless steel, austenitic stainless steel, austenitic ferritic stainless steel and/or precipitation hardening stainless steel.

The dimensions of the main body and the lid of the exterior case are mainly determined according to the dimensions of the electrode assembly. For example, the exterior case may have such a dimension that movement of the electrode assembly in the exterior case is prevented when the electrode assembly is housed. By preventing the movement of the electrode assembly, damage to the electrode assembly due to impact or the like can be prevented, and the safety of the secondary battery can be improved.

The exterior case may be a flexible case such as a pouch made of a laminated film. Examples of the laminated film may have a configuration in which at least a metal layer (for example, aluminum or the like) and an adhesive layer (for example, polypropylene and/or polyethylene, etc.) are laminated, and a configuration in which a protective layer (for example, nylon and/or polyamide, etc.) is additionally laminated.

The thickness dimension (that is, the thickness dimension) of the exterior case is not particularly limited, but is preferably 10 μm or more and 200 μm or less, for example, 50 μm or more and 100 μm or less. As the thickness dimension of the exterior case, an average value of measured values at any 10 points may be used.

The secondary battery is generally provided with an electrode terminal. Such an electrode terminal may be provided on at least one face of the exterior case. For example, the electrode terminal of the positive electrode and the electrode terminal of the negative electrode may be provided away from each other on the same face of the exterior case. Alternatively, the electrode terminal of the positive electrode and the electrode terminal of the negative electrode may be provided on different faces of the exterior case. From the viewpoint of making the secondary battery compact, the electrode terminal of the positive electrode and the electrode terminal of the negative electrode may protrude from the same face. Specifically, the electrode terminals of the positive electrode and the negative electrode may protrude from the side face of the exterior case so as to protrude in a direction perpendicular to the direction in which the electrode layers are laminated.

The electrode terminal preferably comprises a material having high conductivity. The material of the electrode terminal is not particularly limited, but may be at least one selected from the group consisting of silver, gold, copper, iron, tin, platinum, aluminum, nickel, and stainless steel.

The electrode terminal may be composed of a single material or may be composed of a plurality of materials. An electrode terminal (hereinafter, also referred to as an "electrode terminal structure") composed of a plurality of materials includes a rivet portion, an inner terminal, and a gasket portion.

The rivet portion and the inner terminal may be composed of a material capable of achieving movement of electrons. For example, the rivet portion and the inner terminal are each composed of a conductive material such as silver, gold, copper, iron, tin, platinum, aluminum, nickel, and/or stainless steel. The gasket portion may be composed of an insulating material. For example, the gasket portion is composed of an insulating polymer material such as polyester (for example, polyethylene terephthalate), polyimide, polyamide, polyamideimide, and/or polyolefin (for example, polyethylene and/or polypropylene).

Each of the current collecting tabs of the positive and negative electrodes is electrically connected to the electrode terminal or the electrode terminal structure, and is electrically led out to the outside with the electrode terminal or the electrode terminal structure interposed therebetween.

Although the electrode terminal structure is not particularly limited, for example, the electrode terminal structure may be fitted and inserted into the through hole of the exterior case. The electrode terminal structure may include a conductive rivet portion for mainly leading the electrode to the outside, an outer gasket portion for preventing leakage of the electrolyte while ensuring electrical insulation between the rivet portion and the exterior case, an inner terminal for ensuring electrical connection between the rivet portion and the current collecting tab, and an inner gasket portion for preventing leakage of the electrolyte while ensuring electrical insulation between the inner terminal and the exterior case.

The current collecting tabs of the positive and negative electrodes may be connected to an electrode terminal or an electrode terminal structure. In addition, the current collecting tabs of the positive and negative electrodes may be electrically connected to the exterior case, and may be led out to the outside with the exterior case interposed therebetween. For example, when the exterior case is a conductive hard case type exterior case, the current collecting tab may be in contact with and electrically connected to the inside of the exterior case, and may be led out to the outside with the exterior case interposed therebetween. In other words, the exterior case may be connected to the current collecting tab to assume a charge of the positive electrode or the negative electrode, and the current collecting tab may be electrically led out to the outside from the electrode terminal provided on the exterior case.

From the viewpoint of compactness and voltage balancing of the secondary battery, the current collecting tab of any one of the positive and negative electrodes may be electrically connected to the electrode terminal structure, and the current collecting tab of the other electrode may be electrically connected to the inside of the conductive hard case type exterior case.

Any spacer used in the field of secondary battery can be used as the spacer. The spacer is not particularly limited as long as it prevents, for example, electronic contact between the electrode assembly (particularly the electrode) and the exterior case (particularly the electrode terminal). Therefore, the spacer can also be referred to as an insulating member that prevents electronic contact between the electrode assembly and the exterior case (particularly, the electrode terminal thereof). The spacer may have, for example, a plate shape as a whole. Examples of the material constituting the spacer include polymer materials such as polyolefin (for example, polyethylene and/or polypropylene, etc.), polystyrene, polyester (for example, polyethylene terephthalate and/or polybutylene terephthalate), polyvinyl chloride, acrylic polymer (for example, polymethyl methacrylate or the like) and/or polycarbonate, and various insulating materials such as rubber materials such as nitrile rubber, urethane rubber, fluororubber and/or silicone rubber. The spacer may have any form as long as contact between the electrode assembly and the exterior case can be prevented. For example, the spacer may have a form of a film, a sheet, a board, or a fabric (for example, a nonwoven fabric).

A secondary battery according to an embodiment of the present disclosure is a battery including an electrode assembly and an exterior case housing the electrode assembly, and is characterized by the shape of a spacer disposed in the exterior case.

Specifically, in the secondary battery according to an embodiment of the present disclosure, the spacer has a first recess for the positive electrode current collecting tab and a second recess for the negative electrode current collecting tab at the outer edge in plain view. In the exemplary embodiment shown in FIG. 2, the secondary battery includes a spacer 4 positioned between the electrode assembly 200 and the exterior case 300 (310) inside the exterior case 300 (310), and the spacer 4 has a first recess 41 for the positive electrode current collecting tab 61 and a second recess 42 for the negative electrode current collecting tab 62 at the outer edge.

With the recesses 41 and 42, one end of each of the positive electrode current collecting tab 61 and the negative electrode current collecting tab 62 protruding from the electrode assembly 200 can be positioned toward the exterior case (that is, to the electrode terminals $5_1$ and $5_2$) without the opening penetrating the spacer 4. In the case of a penetrating opening, all the positive electrode current collecting tab and all the negative electrode current collecting tab are surrounded by contour faces of the recess 41 and the recess 42, respectively, in sectional view or plan view. Therefore, due to the formation of the space by the opening form, the upper portion and the bottom portion, of the contour of the opening, facing away from each other are easily deformed so as to approach each other due to an impact from the outside or the like.

On the other hand, in the case of the recess, part of the positive electrode current collecting tab and part of the negative electrode current collecting tab are surrounded by contour faces of the recess 41 and the recess 42, respectively, in sectional view or plan view. Specifically, in sectional view or a plan view, part of the contour of the positive electrode current collecting tab and part of the contour of the negative electrode current collecting tab are surrounded by the contour faces of the recess 41 and the recess 42, respectively.

In other words, all the positive electrode current collecting tab 61 and all the negative electrode current collecting tab 62 are not surrounded by the contour faces of the recess 41 and the recess 42, respectively, in sectional view or plan view. Specifically, in the sectional view or the plan view, all of the contour of the positive electrode current collecting tab 61 and all of the contour of the negative electrode current collecting tab 62 are not surrounded by the contour faces of the recess 41 and the recess 42, respectively.

According to such a configuration, since there is no upper portion facing the bottom portion, of the contour, facing away from each other, the upper portion and the bottom portion, of the contour, facing away from each other of the opening do not come close to each other due to an impact from the outside or the like. As a result, deformation and/or breakage of the recess hardly occur. As a result, it is possible to suppress a decrease in the strength of the solid portion of the spacer 4 around the hollow portion formed by being surrounded by the contour of the recess provided in the spacer 4 for the current collecting tabs 61 and 62. Therefore, deformation and/or breakage around the hollow portion can be prevented, and a short circuit due to contact between the current collecting tabs 61 and 62 can be more suitably prevented.

In the spacer, the first recess and the second recess are provided with a separation portion interposed therebetween. In other words, the first recess and the second recess are not connected to each other, and are provided separately. Here, the "separation portion" refers to a solid portion positioned between the first recess and the second recess in the spacer, that is, a continuous portion constituting part of the spacer.

Figure 2:
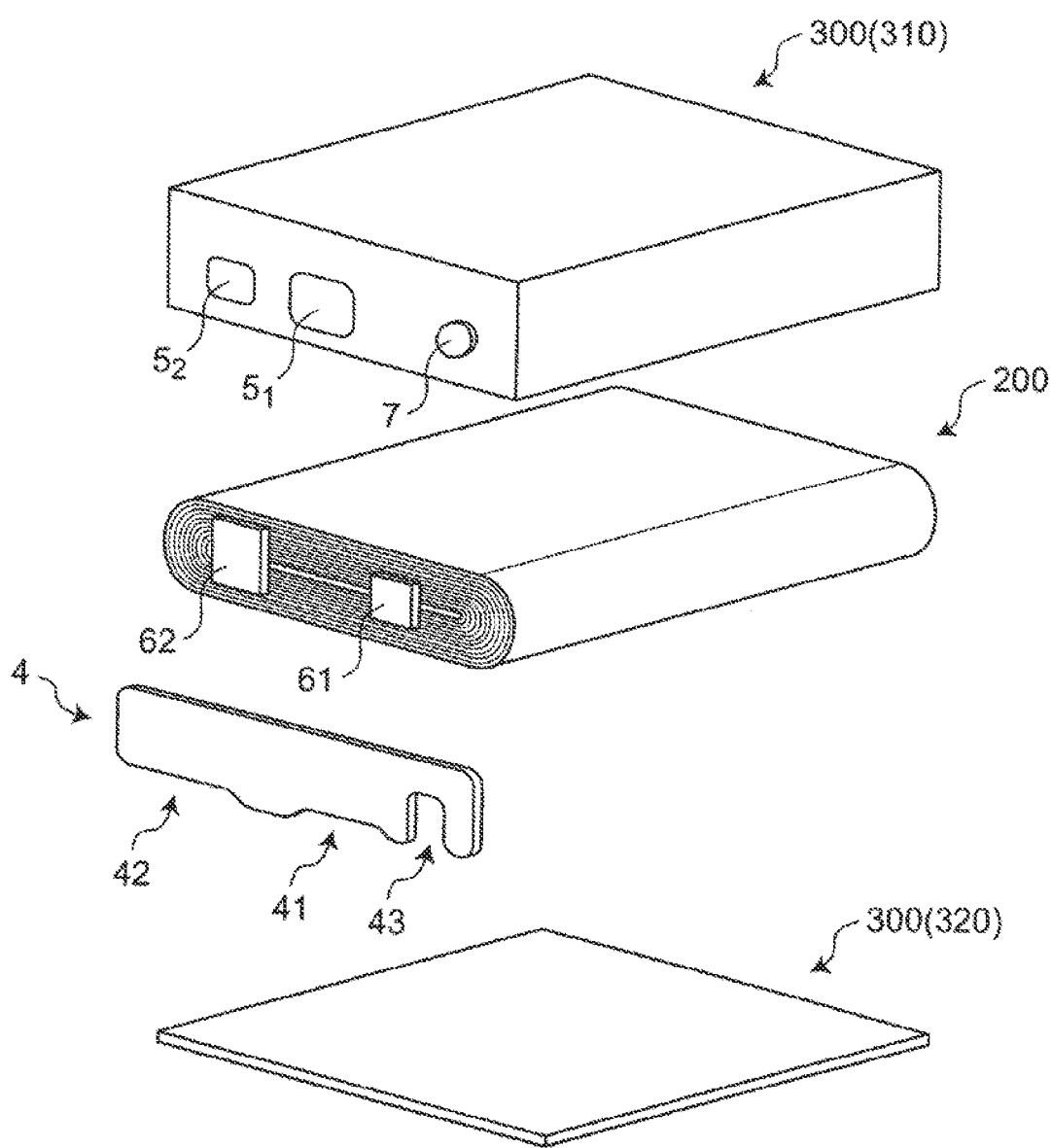
FIG. 2 is a schematic perspective developed view of a secondary battery according to an embodiment of the present disclosure.

In the exemplary embodiment shown in FIG. 2, in the spacer 4, the first recess 41 and the second recess 42 are provided with the separation portion interposed therebetween. Since the recesses 41 and 42 are provided with the separation portion interposed therebetween, the current collecting tab can be accommodated in each of the recesses, so that it is possible to prevent each positional deviation of the positive electrode current collecting tab 61 and the negative electrode current collecting tab 62. This can particularly prevent a short circuit in the secondary battery. Further, in the spacer 4, a portion where the current collecting tab is provided.

The "recess for the current collecting tab" in the present disclosure refers to a recess capable of housing and disposing the current collecting tab. For example, it refers to an aspect in which the current collecting tab crosses the recess and/or the current collecting tab can be fitted (or fixed) to the recess.

Figure 3:
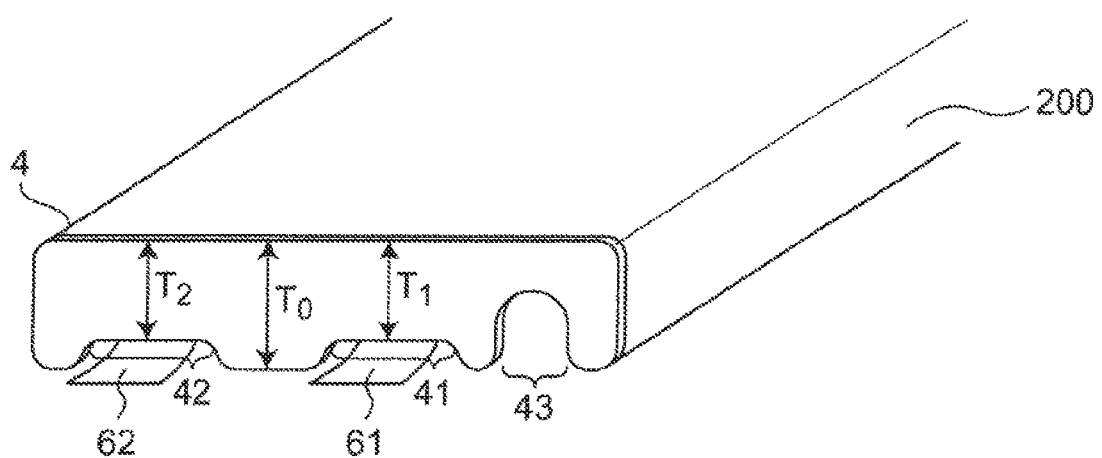
FIG. 3 is a schematic perspective view of the electrode assembly to which a spacer is attached in the secondary battery according to an embodiment of the present disclosure.
Figure 7:
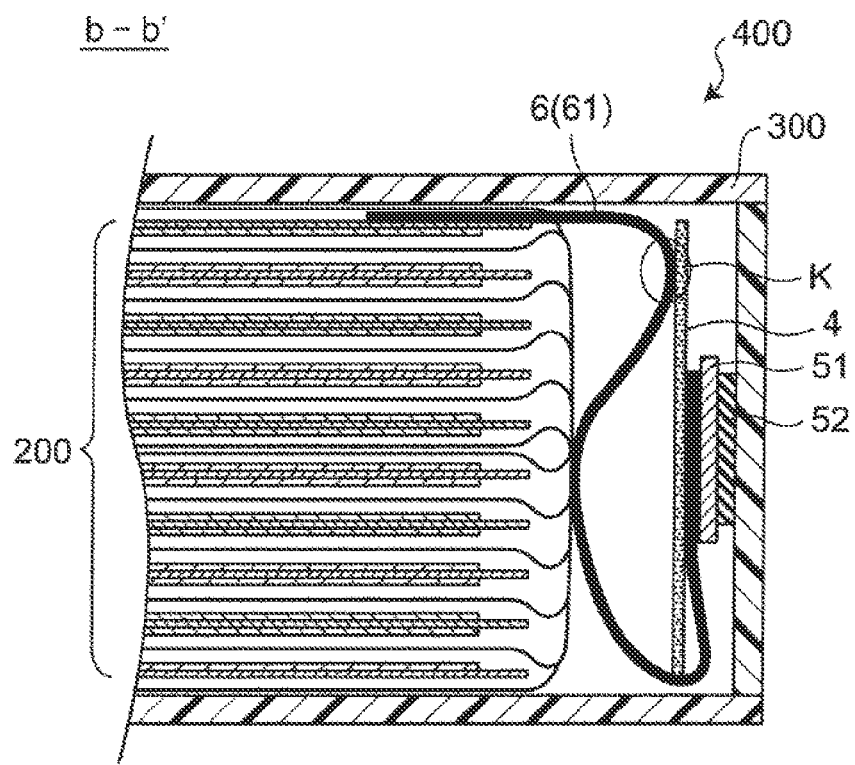
FIG. 7 is a schematic sectional view of the secondary battery taken along line b-b' in FIG. 5.
Figure 8:
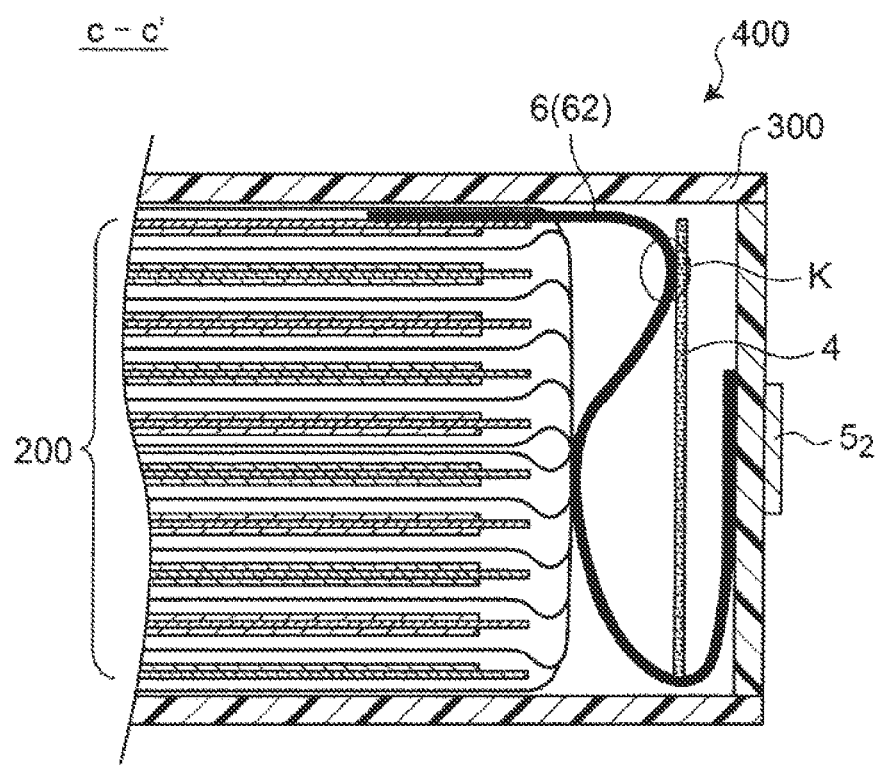
FIG. 8 is a schematic sectional view of the secondary battery taken along line c-c' in FIG. 5.

In the exemplary embodiment shown in FIGS. 3, 7, and 8, the positive electrode current collecting tab 61 crosses the first recess 41, and the negative electrode current collecting tab 62 crosses the second recess 42. In other words, the positive electrode current collecting tab 61 extends through the first recess 41, and the negative electrode current collecting tab 62 extends through the second recess 42. Accordingly, the positive electrode current collecting tab 61 and the negative electrode current collecting tab 62 can be extended from one side (that is, the electrode assembly 200 side) to the other side (that is, the electrode terminals $5_1$ and $5_2$ side) of the spacer 4.

The "recess" in the present disclosure refers to a recess having a dent (or a step) in the same plane. The recess contour in sectional view of the secondary battery may be curved, linear, or a combination thereof. From the viewpoint of improving the strength, it is preferable that the recess contour is curved at the corner portion of the recess and linear at the bottommost portion of the recess.

In the spacer according to the present disclosure, by forming the hollow portion for providing the current collecting tab as the recess, an area of the hollow portion can be reduced as compared with a case where the hollow portion is a penetrating opening. In addition, the shape of the corner in the hollow portion can be formed to have a large radius of curvature, and a structure in which stress concentration hardly occurs can be obtained. Therefore, it is possible to suppress a decrease in strength around the hollow portion provided in the spacer for the current collecting tab.

From the viewpoint of further suppressing a decrease in strength of the peripheral portion of the recess, the first recess and the second recess are preferably smaller steps. Specifically, the ratio of each of the width dimensions ($T_1$ and $T_2$) of the solid portions forming the first recess 41 and the second recess 42 to the width (or thickness) dimension $T_0$ of the separation portion between the first recess and the second recess in the spacer 4 is 0.50 or more and 0.99 or less (see FIG. 3). When the ratio is 0.99 or less, the current collecting tab more easily crosses the recess. When the ratio is 0.50 or more, the area of the hollow portion can be reduced, and the decrease in the strength of the peripheral portion of the one recess can be more effectively suppressed.

The first recess and the second recess preferably have a corner shape with a larger radius of curvature. Specifically, the radius of curvature of the corners of the first recess and the second recess is preferably 20% or more and 180% or less of the width dimension of the notched portions forming the first recess 41 and the second recess 42. When the radius of curvature is within such a range, it is possible to reduce stress concentration on the peripheral portion of the recess while securing a space for the current collecting tab.

The parameter related to the shape of the current collecting tab may refer to a dimension measured using a micrometer (model number MDH-25 MB manufactured by Mitsutoyo Corporation) or a height gauge, or a value calculated from the dimension.

In plain view of the spacer 4 according to the embodiment of the present disclosure, the first recess 41 and the second recess 42 may not reach the end of the spacer (see FIG. 4A and the like) or may reach the end of the spacer 4 (see FIGS. 4B and 4C) from the viewpoint of securing at least a space for the current collecting tab. It is preferable that the first recess 41 and the second recess 42 do not reach the end of the spacer 4 from the viewpoint of securing a space for the current collecting tab and reducing stress concentration on the peripheral portion of the recess (see FIG. 4A and the like). In addition, the first recess 41 and the second recess 42 may be provided at one side of the outer edge of the spacer 4 (that is, on the same plane) (see FIG. 4A and the like), or may be provided at two opposing sides of the outer edge of the spacer 4, respectively (see FIG. 4D). In the former case, the current collecting tabs can be positioned at substantially the same height, and accordingly, terminals having substantially the same size can be disposed on substantially the same axis.

Figure 4A:
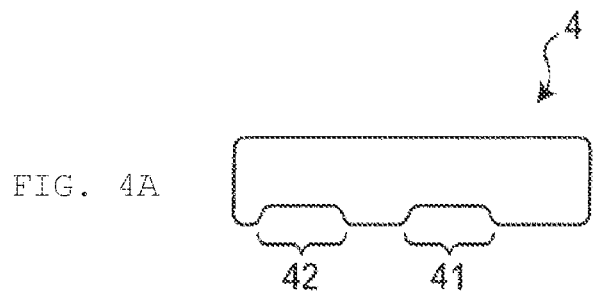
Figure 4C:
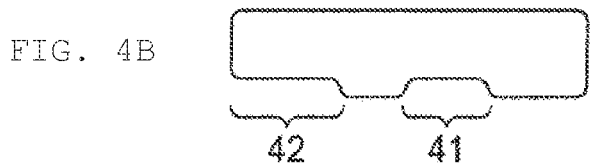
Figure 4D:
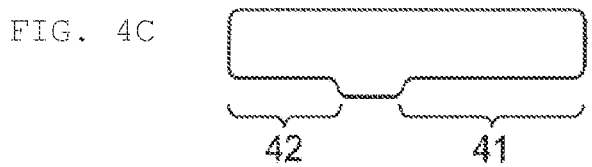

The convex separation portion may be formed by providing two concave shapes of the first recess 41 and the second recess 42 at one side of the outer edge of the spacer (see FIG. 4A and the like), and the S-shaped separation portion may be formed by providing concave shapes of the first recess 41 and the second recess 42 at two opposing sides of the outer edge of the spacer 4, respectively (see FIG. 4D).

In an embodiment, the spacer 4 has the first recess 41 and the second recess 42 at one of opposing sides of the outer edge, and the other of opposing sides of the outer edge has a substantially linear shape in plain view (see FIG. 4A and the like). Since one side of the outer edge of the spacer 4 has a substantially linear shape, positioning accuracy for the exterior case can be improved. Accordingly, the spacer 4 can be particularly fitted to the inside of the exterior case. In addition, the occurrence of local stress concentration can be reduced, and a decrease in the strength of the spacer can be particularly suppressed.

In an embodiment, one face of the main face of the spacer is in contact with the exterior case. Accordingly, the positional deviation of the spacer can be prevented, and a short circuit can be particularly prevented.

In a more preferred embodiment, one face of the main face of the spacer is in contact with the electrode terminal structure of the exterior case. More specifically, in sectional view of the secondary battery 400, the electrode terminal structure 5' is provided on the exterior case 300, and the spacer 4 is in contact with the rivet portion 50 of the electrode terminal structure 5' (or attached to the rivet portion 50) (see FIG. 6). With such a configuration, it is possible to provide a space in which the current collecting tab can extend between the spacer 4 and the exterior case 300 while preventing the positional deviation between the spacer 4 and the exterior case 300.

Figure 6:
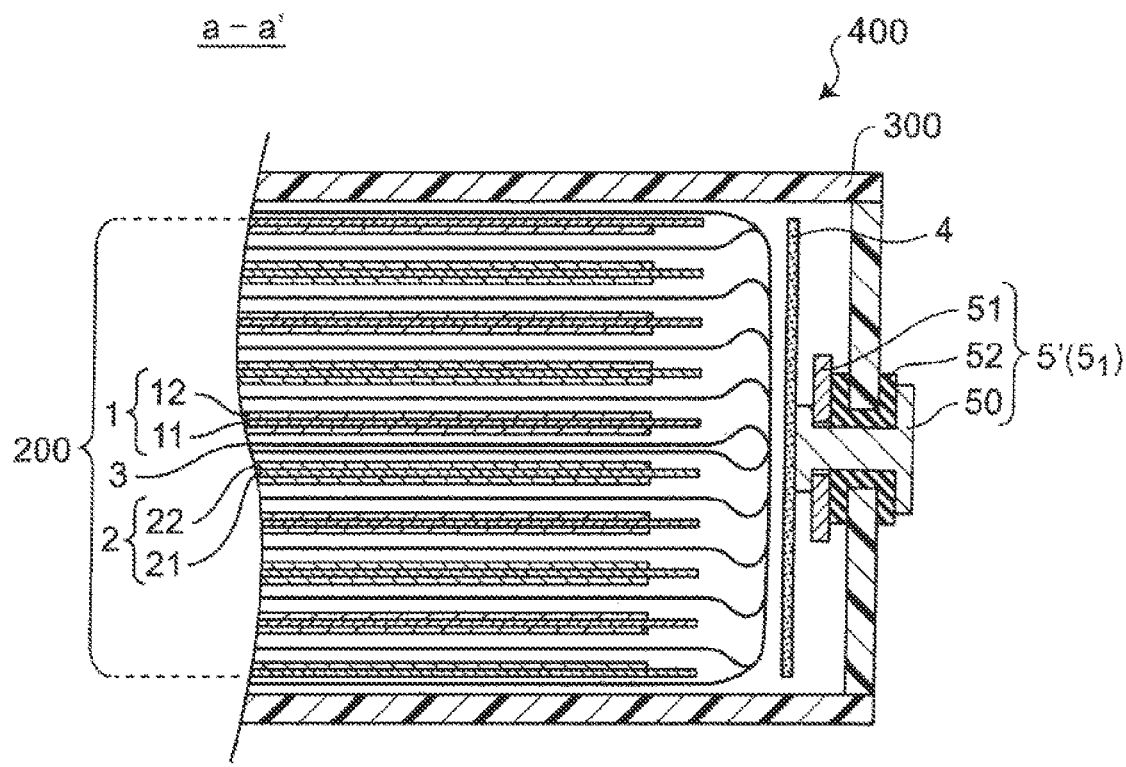
FIG. 6 is a schematic sectional view of the secondary battery taken along line a-a' in FIG. 5.

In a further preferred embodiment, the spacer 4 includes an adhesive layer, and the adhesive layer and the exterior case 300 are in contact with each other (see FIG. 6). When the spacer 4 is in contact with the exterior case 300 with the adhesive layer interposed therebetween, the positional deviation between the spacer 4 and the exterior case 300 can be particularly prevented.

In an embodiment, at least one of the positive electrode current collecting tab and the negative electrode current collecting tab is in contact with the spacer. With such a configuration, the current collecting tab and the spacer can be fixed, and the positional deviation between them can be further prevented. Specifically, the current collecting tab 6 (that is, the positive electrode current collecting tab 61 and/or the negative electrode current collecting tab 62) is in contact with the spacer 4 at the portion K having the bent shape (see FIGS. 7 and 8). Since the portion K serves as a fulcrum, the current collecting tab 6 can be elastically brought into contact with the spacer 4, and an impact that can be generated between the electrode assembly 200 and the spacer 4 can be further absorbed. Thereby, deformation and/or breakage of the spacer 4 can be prevented. Here, the "bent shape" refers to a shape bent from one direction toward a direction opposite to the above direction (for example, a shape bent in an arch shape).

In an embodiment, the adhesive layer provided on the main face of the spacer 4 toward the exterior case 300 is in contact with the rivet portion 50 of the electrode terminal structure 5' (see FIG. 6). One end, of the positive electrode current collecting tab 61, extending toward the exterior case 300 is attached to the inner terminal 51 of the electrode terminal structure 5' (that is, the positive electrode terminal 51) (see FIG. 7). Similarly, one end, of the negative electrode current collecting tab 62, extending toward the exterior case 300 is attached to a position, of the inside of the exterior case 300, corresponding to the negative electrode terminal 52 (see FIG. 8). With such a configuration, the spacer and the current collecting tab are each fixed to the exterior case, and the positional deviation between the spacer and the current collecting tab can be further prevented.

In an embodiment, at least one of the positive electrode current collecting tab and the negative electrode current collecting tab extends from the electrode assembly to the exterior case so as to straddle opposing faces of the main face of the spacer. In the illustrated exemplary embodiment, the current collecting tabs 61 and 62 straddles the spacer 4 to extend toward the exterior case 300 (see FIGS. 7 and 8). Here, "extending so as to straddle opposing faces of the main face of the spacer" means that the tab extends on opposing faces of the main face of the spacer 4 to at least ¼ or more of the width dimension of the spacer 4 in sectional view of the secondary battery 400. In the present aspect, the current collecting tabs 61 and 62 cross the first recess and the second recess of the spacer 4 and straddle the spacer 4. With such a configuration, it is possible to cause the current collecting tab and the spacer to interfere with each other, and it is possible to particularly prevent the positional deviation therebetween.

In an embodiment, the spacer has the first recess and the second recess at one side of the outer edge in plain view, and one face of the main face of the spacer and the exterior case are in contact with each other at the separation portion of the spacer. In the exemplary embodiment shown in FIG. 3, the spacer 4 and the exterior case are in contact with each other at a separation portion between the first recess 41 and the second recess 42 in the spacer 4. By fixing the spacer 4 at the position (that is, the separation portion) between the first recess 41 and the second recess 42, it is possible to more effectively prevent the positional deviation of the positive electrode current collecting tab 61 and the negative electrode current collecting tab 62 which cross the first recess 41 and the second recess 42, respectively and it is possible to particularly suitably prevent the short circuit.

In an embodiment, the exterior case 300 has an electrolyte injection port 7 in the same plane in which the electrode terminal 5 is provided, and the spacer 4 has a third recess 43 corresponding to the injection port 7 (see FIG. 2). By providing the third recess 43 in the spacer 4, it is possible to prevent damage to the electrode assembly 200 that may occur when an injection nozzle (not illustrated) is inserted into the injection port 7. More specifically, the position of the injection nozzle can be fixed by the third recess 43, and damage due to collision of the injection nozzle with the electrode assembly 200 can be prevented. In addition, since there is no inclusion such as a spacer between the injection nozzle and the electrode assembly 200, the electrolyte can be directly injected into the electrode assembly. Thereby, the infusion rate and the impregnation rate can be more effectively enhanced.

In plain view of the spacer according to the present disclosure, the third recess 43 of the spacer 4 may be formed at one side, of the outer edge, where the first recess 41 and the second recess 42 are formed (see FIGS. 4E and 4F), or may be formed at the other side opposite to the one side, of the outer edge, where the first recess 41 and the second recess 42 are formed (see FIG. 4G). From the viewpoint of preventing the positional deviation of the current collecting tab, in the spacer 4, the third recess 43 is provided with a separation portion interposed between the first recess 41 and the second recess 42.

Figure 4E:
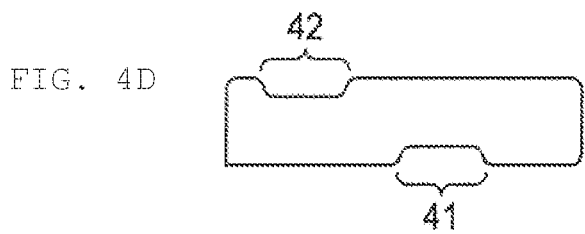
Figure 5:
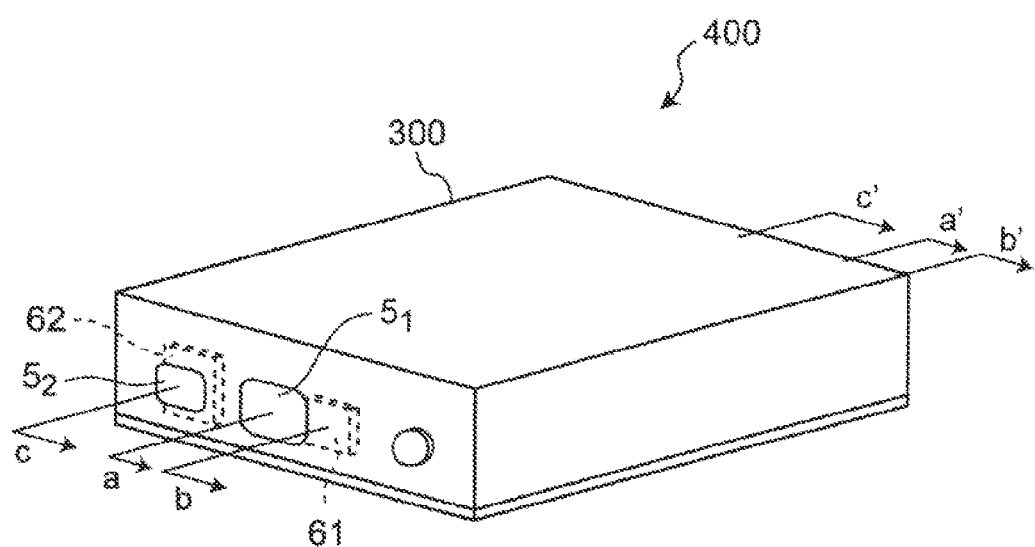
FIG. 5 is a schematic perspective assembly view of the secondary battery according to an embodiment of the present disclosure.

In an embodiment, the spacer 4 has the first recess 41, the second recess 42, and the third recess 43 at one of the opposing sides of the outer edge, and the other of the opposing sides of the outer edge has a substantially linear shape in plain view (see FIGS. 4E and 4F). Since one side of the outer edge of the spacer 4 has a substantially linear shape, positioning accuracy for the exterior case can be improved. Accordingly, the spacer 4 can be particularly fitted to the inside of the exterior case. In addition, the occurrence of local stress concentration can be reduced, and a decrease in the strength of the spacer can be particularly suppressed.

In an embodiment, in plain view of the spacer, an outer edge of the spacer, except for an outer edge forming a recess, has a shape along an inner edge of the exterior case. With such a configuration, the spacer can be particularly fitted into the inside of the exterior case. In addition, the first recess 41 and the second recess 42 of the spacer 4 can be away from each other, and a short circuit due to contact between the positive electrode current collecting tab 61 and the negative electrode current collecting tab 62 can be particularly suitably prevented. (see FIG. 3).

In an embodiment, the thickness dimension of the spacer according to the present disclosure is 100 μm or more and 5 mm or less. When the thickness dimension is 100 μm or more, the spacer can have more excellent rigidity and heat resistance. As a result, when an impact or heat is applied to the secondary battery, the spacer can be made more hardly damaged. When the thickness dimension is 5 mm or less, the secondary battery can be made more compact. The thickness dimension of the spacer is preferably 0.15 mm or more and 3 mm or less, for example, 0.15 mm or more and 1.5 mm or less.

In an embodiment, the Young's modulus of the spacer according to the present disclosure is 0.01 GPa or more and 20 GPa or less. When the Young's modulus is within such a range, it is possible to improve the rigidity while maintaining the good handling property of the spacer. The Young's modulus of the spacer is preferably 1.0 GPa or more and 15 GPa or less, and is, for example, 2.0 GPa or more and 10 GPa or less.

In an embodiment, the continuous heat-resistant temperature (or continuous use temperature) of the spacer according to the present disclosure is 60° C. or higher. When the continuous heat-resistant temperature is 60° C. or higher, the spacer can be made more hardly deformed when heat is applied to the secondary battery. The continuous heat-resistant temperature of the spacer is preferably 80° C. or higher, for example, 100° C. or higher.

In an embodiment, the spacer according to the present disclosure contains at least one selected from the group consisting of polyethylene terephthalate, polybutylene terephthalate, and polycarbonate. When the spacer contains such a composition, the spacer can be more excellent in rigidity and heat resistance.

A method of manufacturing a secondary battery according to an embodiment of the present disclosure includes the following steps. This makes it possible to manufacture such a secondary battery. That is, a method of manufacturing a secondary battery according to the present disclosure includes a step (electrode assembling step) of laminating or winding a positive electrode, a negative electrode, and a separator disposed between the positive electrode and the negative electrode to obtain a precursor of an electrode assembly, a step (spacer forming step) of forming a spacer including a first recess and a second recess, and a step (housing step) of welding a current collecting tab while housing the electrode assembly and the spacer in an exterior case and injecting an electrolyte into the exterior case.

Figure 9:
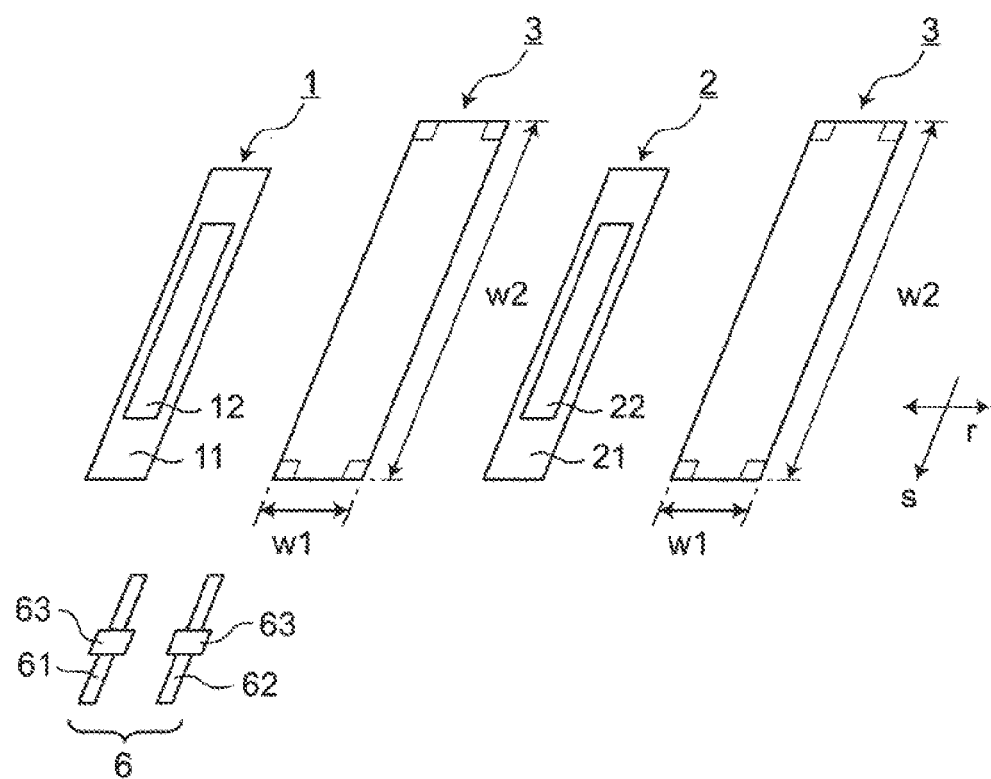
FIG. 9 is a schematic perspective view for explaining constituent members of the electrode assembly constituting the secondary battery according to an embodiment of the present disclosure.
Figure 10A:
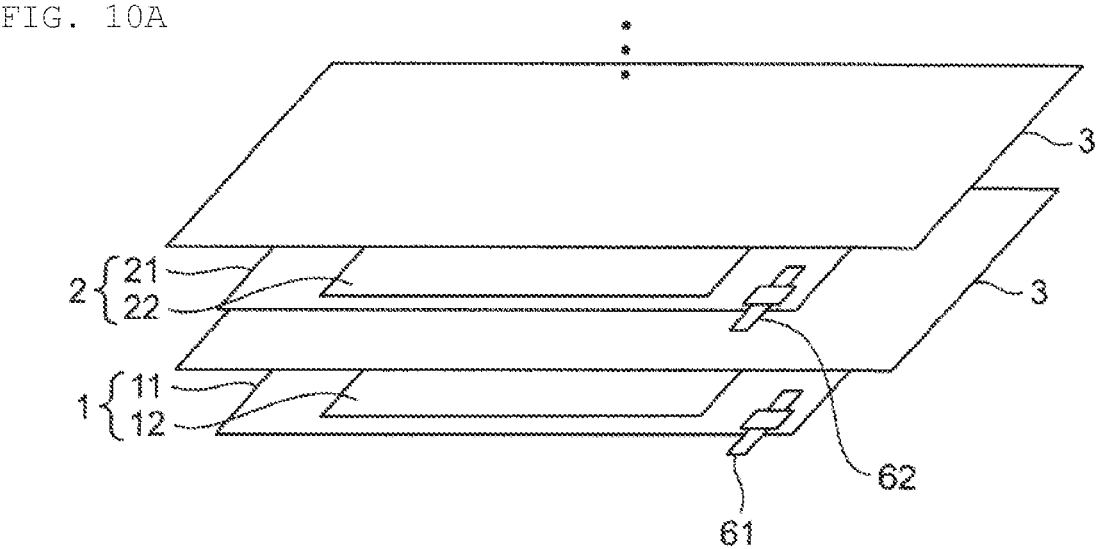
FIGS. 10A and 10B are schematic perspective views for explaining a method of assembling electrodes constituting the secondary battery according to an embodiment of the present disclosure.
Figure 10B:
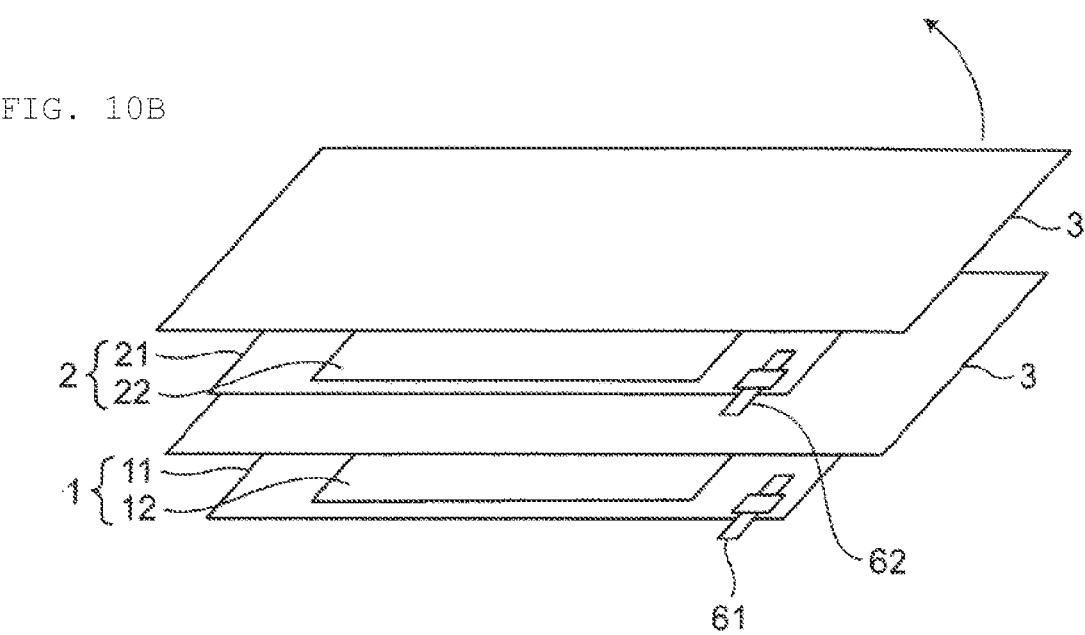
Figure 11A:
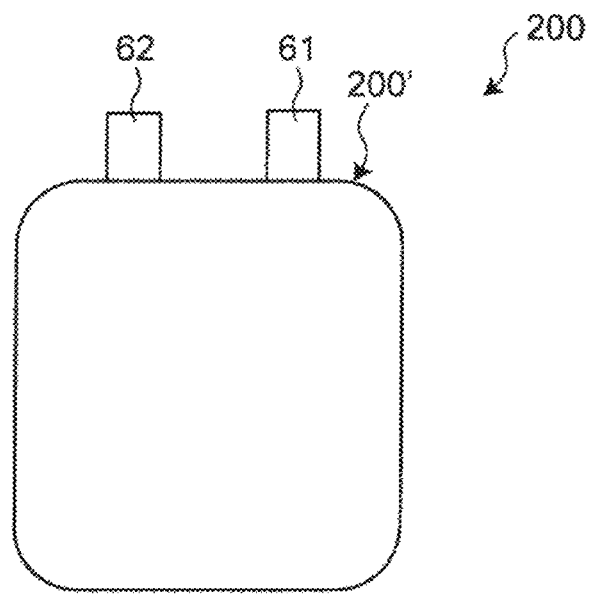
FIGS. 11A and 11B are schematic diagrams (FIG. 11A: electrode assembly, FIG. 11B: spacer) of constituent members of a secondary battery according to a conventional technique.
Figure 11B:
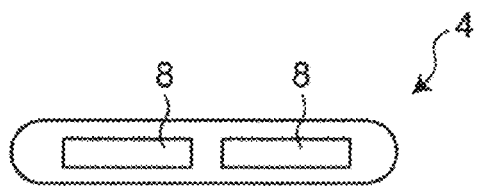

In this step, as shown in FIG. 9, the positive electrode 1, the negative electrode 2, and the separator 3 having a rectangular shape are disposed in a predetermined order and laminated or wound to obtain a precursor of the electrode assembly. As shown in FIG. 10A, the precursor of the electrode assembly may be the planar lamination type electrode assembly 200 (see FIG. 1A) in which the positive electrode 1, the negative electrode 2, and the separator 3 are laminated in the thickness direction. Alternatively, as shown in FIG. 10B, the precursor of the electrode assembly may be a wound electrode assembly 200 (see FIG. 1B) by winding the positive electrode 1, the negative electrode 2, and the separator 3. Hereinafter, an assembly step of the wound electrode assembly will be described.

First, the positive electrode 1 having the positive electrode current collecting tab 61 attached to one side of the positive electrode current collector 11, the negative electrode 2 having the negative electrode current collecting tab 62 attached to one side of the negative electrode current collector 21, and two rectangular separators 3 are disposed in a predetermined order and wound (see FIG. 10B).

The dimensions of the separator 3 to be used are not particularly limited as long as a desired electrode assembly is obtained. For example, the length dimension w1 of the separator 3 in the width direction r is usually preferably 110% or more and 400% or less, and for example, 120% or more and 200% or less of the length of the positive electrode 1 or the negative electrode in the winding axis direction (see FIG. 9). For example, the length dimension w2 of the separator 3 in the longitudinal direction s may be appropriately determined according to the dimension of the intended secondary battery (particularly, the number of windings for the electrode assembly).

After this step, the precursor of the wound electrode assembly may be formed into a substantially flat column shape by pressing the precursor in the diameter direction of the wound body as desired.

The recess shape of the spacer of the secondary battery according to an embodiment of the present disclosure may be formed by punching a sheet-like material so as to obtain a desired outer edge shape of the spacer by punching. The recess shape of the spacer may be formed by cutting out from the outer edge of the spacer formed in a substantially linear shape. Alternatively, the recess shape of the spacer may be formed by injection molding in which a material heated and melted is injected into a mold having a desired mold shape and cooled and solidified.

In a preferred aspect, a spacer having a first recess and a second recess and/or a third recess is provided by forming a sheet-like material by punching. With such a configuration, the spacer according to the present disclosure can be easily manufactured at low cost. Hereinafter, a step of manufacturing the spacer by punching will be described.

First, a polyethylene terephthalate material (thickness dimension: 0.188 mm) formed in a sheet shape is mounted on a rotary type or a punching type cutting device. Next, the polyethylene terephthalate material is punched out using a punching blade (for example, pinnacle (registered trademark) blades) disposed so that the first recess, the second recess, and the third recess are formed side by side in this order on the same side. Thereafter, the unnecessary portion is removed to obtain the spacer 4 having the first recess 41, the second recess 42, and the third recess 43 (see FIG. 4E).

While the electrode assembly 200 and the spacer 4 obtained in the previous step are housed in the exterior case 300, the current collecting tabs 61 and 62 are welded to the electrode terminal 5, and the electrolyte is injected into the exterior case 300 through the injection port 7 (see FIG. 2). Hereinafter, a case where the exterior case 300 includes an exterior case main body 310 and an exterior case lid 320, and an electrode terminal 5 and an electrode terminal structure 5' are provided on one face of the exterior case 300 will be described in detail.

First, as illustrated in FIGS. 7 and 8, the current collecting tabs 61 and 62 are temporarily bent to adjust the shape so that the current collecting tabs 61 and 62 straddles opposing faces of the main face of the spacer 4 to extend from the electrode assembly 200 side to the exterior case 300 side, and then crosses the first recess and the second recess of the spacer 4.

Next, the electrode assembly 200 and the spacer 4 are housed in the exterior case main body 310 (see FIG. 2). At this time, an adhesive layer (not shown) provided on the main face of the spacer 4 toward the exterior case 300 is attached to the rivet portion 50 of the electrode terminal structure 5' (see FIG. 6). One end, of the positive electrode current collecting tab 61, extending toward the exterior case 300 is welded to the inner terminal 51 of the electrode terminal structure 5' (that is, the positive electrode terminal 51) (see FIG. 7). Similarly, one end, of the negative electrode current collecting tab 62, extending toward the exterior case 300 is welded to a position, of the inside of the exterior case 300, corresponding to the negative electrode terminal 5$_2$ (see FIG. 8).

Next, the exterior case main body 310 and the exterior case lid 320 are welded to each other. Finally, an electrolyte may be injected from the injection port 7, and the injection port 7 may be closed with a sealing plug (not shown). The welding may be achieved by any method known in the field of secondary batteries, and for example, a laser irradiation method may be used.

Although the embodiments of the present disclosure have been described above, only typical examples have been illustrated. A person skilled in the art can easily understand that the present disclosure is not limited thereto, and various embodiments are conceivable without changing the gist of the present disclosure.

The secondary battery according to the present disclosure can be used in various fields in which electricity storage is expected. By way of example only, the secondary battery can be used in the fields of electricity, information, and communication in which mobile devices, and the like are used (for example, mobile device fields including mobile phones, smartphones, notebook computers and digital cameras, activity meters, arm computers, electronic paper, and the like), home and small industrial applications (for example, fields of electric power tools, golf carts, and home, nursing, and industrial robots), large industrial applications (for example, fields of forklifts, elevators, and harbor cranes), transportation system fields (for example, fields of hybrid vehicles, electric vehicles, buses, trains, power-assisted bicycles, electric two-wheeled vehicles, and the like), power grid applications (for example, fields such as various types of power generation, road conditioners, smart grids, and household power storage systems), medical applications (medical equipment fields such as earphone hearing aids), pharmaceutical applications (fields such as dosage management systems), IoT fields, space and deep sea applications (for example, fields of space probes and submersibles), and the like.

The secondary battery according to the present disclosure can prevent a short circuit that may occur particularly when an impact or heat is applied to the battery. Therefore, the secondary battery according to the present disclosure can be particularly preferably used for a mobile device application in which an impact or heat can be applied from all directions.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising an electrode assembly including a positive electrode, a negative electrode, and a separator disposed between the positive electrode and the negative electrode, and an electrolyte enclosed in an exterior case, wherein the secondary battery includes a spacer positioned between the electrode assembly and the exterior case, wherein the electrode assembly includes a positive electrode current collecting tab and a negative electrode current collecting tab protruding from the electrode assembly, wherein the spacer includes a first recess for the positive electrode current collecting tab and a second recess for the negative electrode current collecting tab at an outer edge in plan view, and the first recess and the second recess are provided with a separation portion interposed therebetween, and wherein at least one of the positive electrode current collecting tab or the negative electrode current collecting tab is in contact with the spacer.

2. The secondary battery according to claim 1, wherein part of the positive electrode current collecting tab and part of the negative electrode current collecting tab are surrounded by contour faces of the first recess and the second recess, respectively.

3. The secondary battery according to claim 1, wherein all the positive electrode current collecting tab and all the negative electrode current collecting tab are not surrounded by contour faces of the first recess and the second recess, respectively.

4. The secondary battery according to claim 1, wherein the positive electrode current collecting tab and the negative electrode current collecting tab cross the first recess and the second recess, respectively, and extend from one side to an other side of the spacer.

5. The secondary battery according to claim 1, wherein a ratio of a width dimension of each of solid portions at the first recess and the second recess to a width dimension of the separation portion of the spacer is from 0.50 to 0.99.

6. The secondary battery according to claim 1, wherein the spacer includes the first recess and the second recess at one side of opposing sides of the outer edge, and the other side of the opposing sides of the outer edge has a substantially linear shape in plan view.

7. The secondary battery according to claim 1, wherein one face of a main face of the spacer is in contact with the exterior case.

8. The secondary battery according to claim 7, wherein the one face of the main face of the spacer is in contact with an electrode terminal structure on the exterior case.

9. The secondary battery according to claim 7, wherein the spacer includes an adhesive layer, and the adhesive layer and the exterior case are in contact with each other.

10. The secondary battery according to claim 7, wherein the spacer includes the first recess and the second recess at one side of the outer edge in plan view, and one face of the main face of the spacer and the exterior case are in contact with each other at the separation portion of the spacer.

11. The secondary battery according to claim 1, wherein in sectional view of the secondary battery, at least one of the positive electrode current collecting tab or the negative electrode current collecting tab extends from one side to the other side of the spacer to straddle opposing faces of a main face of the spacer.

12. The secondary battery according to claim 1, wherein the exterior case has an injection port for the electrolyte in a same plane in which an electrode terminal is provided, and the spacer further has a third recess corresponding to the injection port.

13. The secondary battery according to claim 12, wherein the spacer includes the first recess, the second recess, and the third recess at one side of opposing sides of the outer edge, and the other side of the opposing sides of the outer edge has a substantially linear shape in plan view.

14. The secondary battery according to claim 1, wherein in plan view of the spacer, the outer edge of the spacer, except for the outer edge forming a recess, has a shape along an inner edge of the exterior case.

15. The secondary battery according to claim 1, wherein the exterior case
further includes an electrode terminal structure of one of the positive electrode and the negative electrode, and
is a conductive case type exterior case, and assumes a charge whose polarity is opposite to a polarity of the electrode terminal structure.

16. The secondary battery according to claim 1, wherein the positive electrode and the negative electrode are capable of absorbing and releasing lithium ions.

17. The secondary battery according to claim 1, wherein the secondary battery is included in a mobile device.

18. The secondary battery according to claim 1, wherein at least one of the positive electrode current collecting tab or the negative electrode current collecting tab includes a bent portion, and wherein at least one of the positive electrode current collecting tab or the negative electrode current collecting tab is in contact with the spacer at least at the bent portion.

19. The secondary battery according to claim 1, wherein at least one of the positive electrode current collecting tab or the negative electrode current collecting tab contacts the spacer at a surface of the spacer on a side of the spacer facing the electrode assembly.

20. The secondary battery according to claim 1, wherein at least one of the positive electrode current collecting tab or the negative electrode current collecting tab includes a bent portion, and wherein at least one of the positive electrode current collecting tab or the negative electrode current collecting tab contacts the spacer on an outside of an arch of the bent portion.

* * * * *